United States Patent
Hsu

(10) Patent No.: US 6,524,046 B2
(45) Date of Patent: Feb. 25, 2003

(54) WEDGE ANCHOR

(76) Inventor: Tai-Ping Hsu, No. 10, Chung-Lu, Chung-Lu Tsun, A-Lien Hsiang, Kaohsiung Hsien (TW)

( * ) Notice: Subject to any disclaimer, the term of this patent is extended or adjusted under 35 U.S.C. 154(b) by 0 days.

(21) Appl. No.: 09/812,145

(22) Filed: Mar. 19, 2001

(65) Prior Publication Data

US 2001/0010787 A1 Aug. 2, 2001

(51) Int. Cl.⁷ ................................................ F16B 13/06
(52) U.S. Cl. ............................ 411/61; 411/51; 411/55; 411/60.2
(58) Field of Search .......................... 411/50, 51, 55, 411/60.1, 60.2, 61, 69

(56) References Cited

U.S. PATENT DOCUMENTS

| | | | | |
|---|---|---|---|---|
| 2,159,580 A | * | 5/1939 | Zifferer | 411/51 |
| 4,173,918 A | * | 11/1979 | Piersall | 411/51 |
| 4,436,445 A | * | 3/1984 | Templeman | 411/50 X |
| 4,636,123 A | * | 1/1987 | Herg | 411/60.1 X |
| 5,011,337 A | * | 4/1991 | Clark et al. | 411/51 X |
| 5,228,250 A | * | 7/1993 | Kesselman | 411/55 X |
| 6,270,303 B1 | * | 8/2001 | Gauthier et al. | 411/61 X |

* cited by examiner

Primary Examiner—Neill Wilson
(74) Attorney, Agent, or Firm—Ostrolenk, Faber, Gerb & Soffen, LLP

(57) ABSTRACT

A wedge anchor has a shank with an expander section having a surface that forms an angle greater than 8° with respect to an axis of the shank. A plurality of longitudinal ribs project radially and outwardly from the expander section, extend along the axis of the shank, and are angularly spaced apart from each other. A tubular expansion sleeve is sleeved on a neck section of the shank adjacent to the expander section, and is formed with a plurality of axially extending slits for engaging the longitudinal ribs when the expander section is extended into the expansion sleeve.

8 Claims, 5 Drawing Sheets

WEDGE ANCHOR

BACKGROUND OF THE INVENTION

1. Field of the Invention

The invention relates to a wedge anchor, more particularly to one that can be driven quickly into a blind hole and that can ensure a stable securing effect.

2. Description of the Related Art

Referring to FIG. 1, a conventional wedge anchor 1 is shown to include a shank 11, a tubular expansion sleeve 12, a washer 13, and a nut fastener 14. The shank 11 has a threaded section 111, a neck section 112 extending forwardly and coaxially from one end of the threaded section 111, and having a diameter slightly smaller than that of the threaded section 111, and an expander section 113 extending fowardly and coaxially from one end of the neck section 112. The expander section 113 has a frusto conical configuration with a cross-section that gradually decreases along an axis of the shank 11 in a direction toward the threaded section 111. The expander section 113 further has a surface that forms an angle of less than 8° with respect to the axis of the shank 11. The expansion sleeve 12 is shorter than the shank 11, is sleeved on the neck section 112, and is formed from two interconnected retaining plates 121 that encircle the neck section 112. Each retaining plate 121 is formed with a boss 122 that projects radially and outwardly with respect to the shank 11. The washer 13 is sleeved on the shank 11, and the nut fastener 14 engages the threaded section 111 of the shank 11.

With further reference to FIG. 2, in use, when mounting a bracket 10 on a wall 2, a blind hole 20, which has a diameter that corresponds to the outer diameter of the shank 11 when sleeved with the expansion sleeve 12, is initially drilled into the wall 2. Thereafter, with the expansion sleeve 12 disposed thereon, the shank 11 is driven into the blind hole 20 with the use of a mallet. By using a spanner to rotate the nut fastener 14 relative to the shank 11, a torque is generated so as to create a force for moving the shank 11 outwardly of the blind hole 20. At this time, movement of the shank 11 will cause the bosses 122 on the retaining plates 121 to engage the surface of the blind hole 20. Also, since an increasing cross-section of the expander section 113 extends into the expansion sleeve 12, the retaining plates 121 are forced by the expander section 113 to expand in a radial outward direction with respect to the shank 11 for engaging the surface of the blind hole 20. Subsequently, the nut fastener 14 and the washer 13 are removed from the shank 11, and the bracket 10 is disposed on the shank 11. The nut fastener 14 and the washer 13 are again provided on the shank 11 for locking tightly the bracket 10 against the wall 2.

Some of the drawbacks associated with the use of the aforesaid conventional wedge anchor 1 are as follows:

1. The surface of the expander section 113 of the shank 11 of the conventional wedge anchor 1 is smooth, and the expansion sleeve 12 is formed with only two retaining plates 121 having only two bosses 122. Thus, when the nut fastener 14 is rotated, since the shank 11 is not held firmly in the blind hole 20, it is possible that the shank 11 will rotate with the nut fastener 14 and will rotate idly inside the blind hole 20 due to inadequate gripping with the surface of the blind hole 20. In addition, friction between the expander section 113 and the expansion sleeve 12 is relatively small. As such, due to lack of engagement between the expander section 113 and the expansion sleeve 12, when the nut fastener 14 is rotated, there is also a possibility that the expansion sleeve 12 will rotate idly relative to the shank 11, thereby preventing expansion of the retaining plates 121.

2. As mentioned hereinbefore, the expansion sleeve 12 is formed from two interconnected retaining plates 121 that encircle the neck section 112 of the shank 11. Because the arc lengths of the retaining plates 121 are relatively long, the retaining plates 121 are undesirably rigid and do not expand easily in the radial outward direction of the shank 11. As such, the surface of the expander section 113 cannot be formed with an angle that is greater than 8° with respect to the axis of the shank 11 since the larger angle will hinder expansion of the retaining plates 121. The smaller angle will result in a longer distance that is required to be traveled by the shank 11 or expanding the retaining plates 121. Thus, the conventional wedge anchor 1 takes up a relatively long amount of time for fixing on the wall 2.

3. Because a relatively long expander section 113 is needed to expand the retaining plates 121, the shank 11 has a relatively large material requirement, thereby resulting in increased costs. In addition, a relatively long length of the shank 11 projects from the wall 2 due to the relatively long distance traveled by the shank 11 when expanding the retaining plates 121. The relatively long projecting length of the shank 11 can hinder subsequent bracket mounting and locking operations.

SUMMARY OF THE INVENTION

Therefore, the object of the present invention is to provide a wedge anchor that can be driven quickly into a blind hole and that can ensure a stable securing effect.

According to the present invention, a wedge anchor includes a shank, a tubular expansion sleeve, and a nut fastener. The shank has a threaded section, a neck section extending forwardly and coaxially from one end of the threaded section, and having a diameter smaller than that of the threaded section, and an expander section extending forwardly and coaxially from one end of the neck section, and having a cross-section that gradually decreases along an axis of the shank in a direction toward the threaded section. The expansion sleeve is shorter than the shank and is sleeved on the neck section. The nut fastener engages the threaded section of the shank.

The expander section has a surface that forms an angle greater than 8° with respect to the axis of the shank, and is further formed with a plurality of longitudinal ribs that project radially and outwardly, that extend along the axis of the shank, and that are angularly spaced apart from each other. The expansion sleeve is formed with a plurality of a axially extending silts for engaging the longitudinal ribs on the expander section when the expander section is extended into the expansion sleeve. The slits configure that expansion sleeve with an annular base strip portion and the more than two retaining plates, each having a base edge connected to the base strip portion, a pair of parallel lateral edges, and a curved distal edge that interconnects the lateral edges and that curves forwardly in a direction away from the base strip portion. The lateral edges of adjacent ones of the retaining plates confine the slits. The curved distal edges of the adjacent ones of the retaining plates cooperate to form entrances into the slits. Each of the retaining plates is formed with a boss that projects radially and outwardly with respect to the shank.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 3:
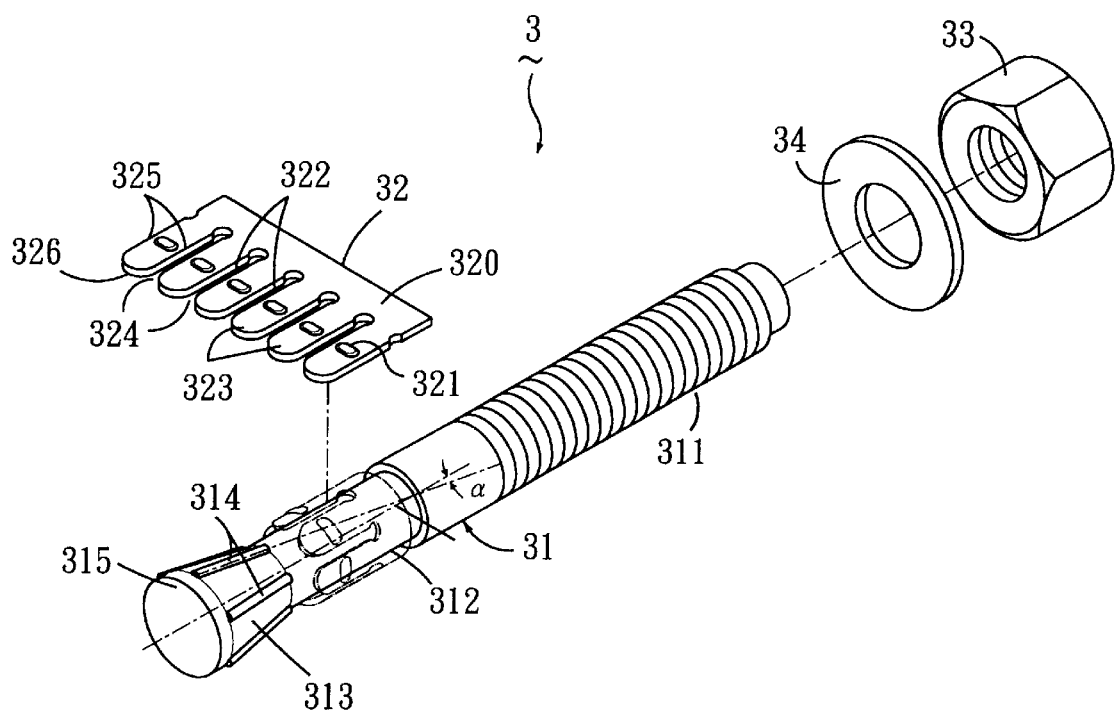
FIG. 3 is an exploded perspective view illustrating the first preferred embodiment of a wedge anchor according to the present invention.
Figure 4:
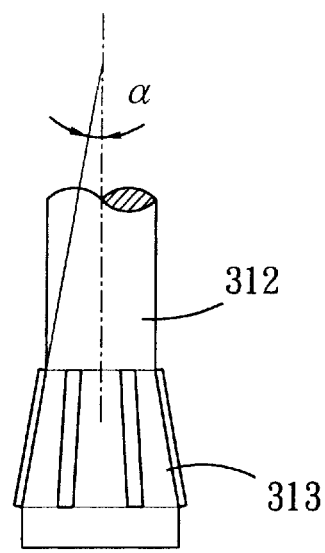
FIG. 4 is a fragmentary schematic view illustrating a shank of the first preferred embodiment.

Referring to FIGS. 3 and 4, the first preferred embodiment of a wedge anchor 3 according to the present invention is shown to include a shank 31, a tubular expansion sleeve 32, a nut fastener 33 and a washer 34. The shank 31 has a threaded section 311, a neck section 312 extending forwardly and coaxially from one end of the threaded section 311, and having a diameter smaller than that of threaded section 311, and an expander section 313 extending forwardly and coaxially from one end of the neck section 312, and having a cross-section that gradually decreases along the axis of the shank 31 in a direction toward the threaded section 311. The expansion sleeve 32 is shorter than the shank 31, and is sleeved on the neck section 312. The washer 34 is sleeved on the shank 31, and the nut fastener 33 engages the threaded section 311.

In this embodiment, the expander section 313 has a frusto conical configuration, and has a largest diameter equal to that of the threaded section 311. The expander section 313 has a surface that forms an angle (α) greater than 8° with respect to the axis of the shank 31. Preferably, the angle (α) is between 10° and 22.5°. More preferably, the angle (α) is between 10° and 15°. In the first preferred embodiment, the angle (α) is 10°. The expander section 313 is further formed with a plurality of longitudinal ribs 314 that project radially and outwardly, that extend along the axis of the shank 31, and that are angularly spaced apart from each other. The shank 31 further has a stop action 315 extending forwardly and coaxially from one end of the expander section 313 and having a diameter equal to that of the threaded section 311.

The expansion sleeve 32 is formed with a plurality of axially extending slits 322 for engaging the longitudinal ribs 314 on the expander section 313 when the latter is extended into the expansion sleeve 32. The slits 322 configure the expansion sleeve 32 with an annular base strip portion 320 and more than two retaining plates 323, each having a base edge connected to the base strip portion 320, a pair of parallel lateral edges 325, and a curved distal edge 326 that interconnects the lateral edges 325 and that curves forwardly in a direction away from the base strip portion 320. The lateral edges 325 of adjacent ones of the retaining plates 322 confine the slits 322. The curved distal edges 326 of the adjacent ones of the retaining plates 322 cooperate to form entrances 324 into the slits 322, respectively. Each of the retaining plates 322 is formed with a boss 321 that projects radially and outwardly with respect to the shank 31.

Figure 1:
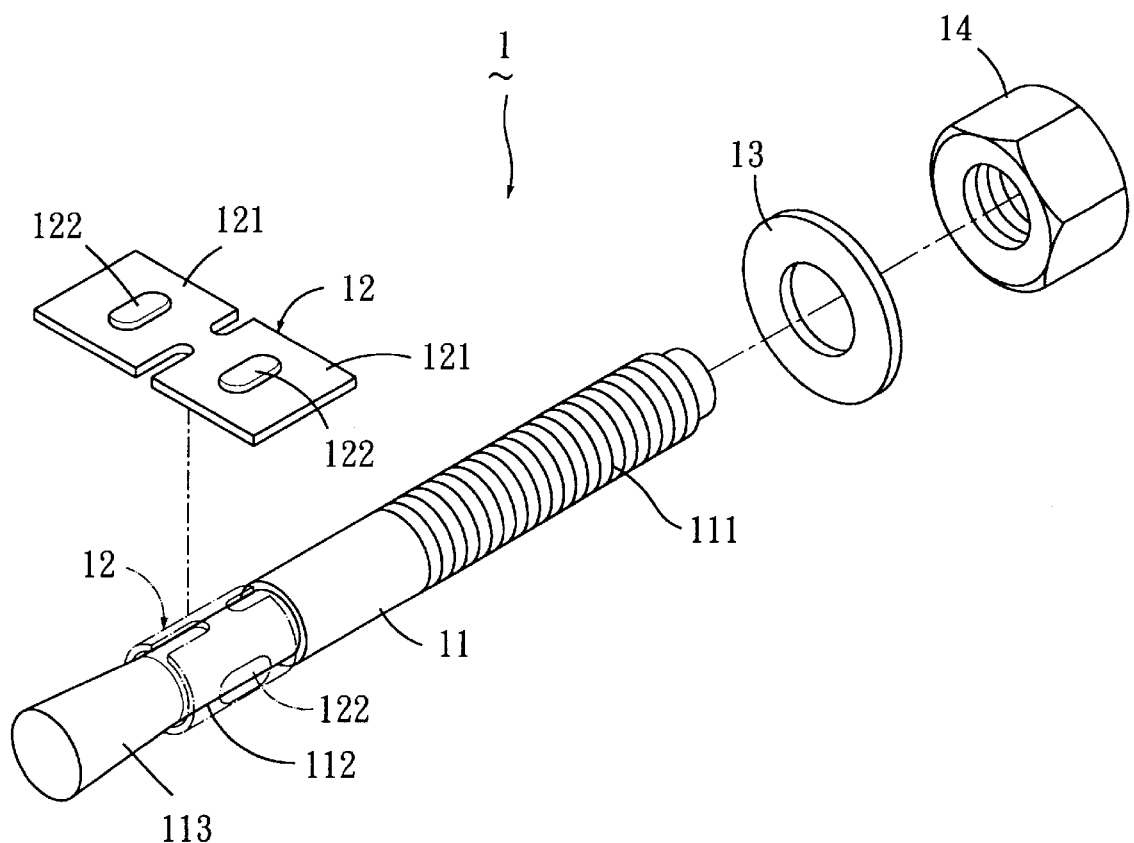
FIG. 1 is an exploded perspective view illustrating a conventional wedge anchor.
Figures 2, 5:
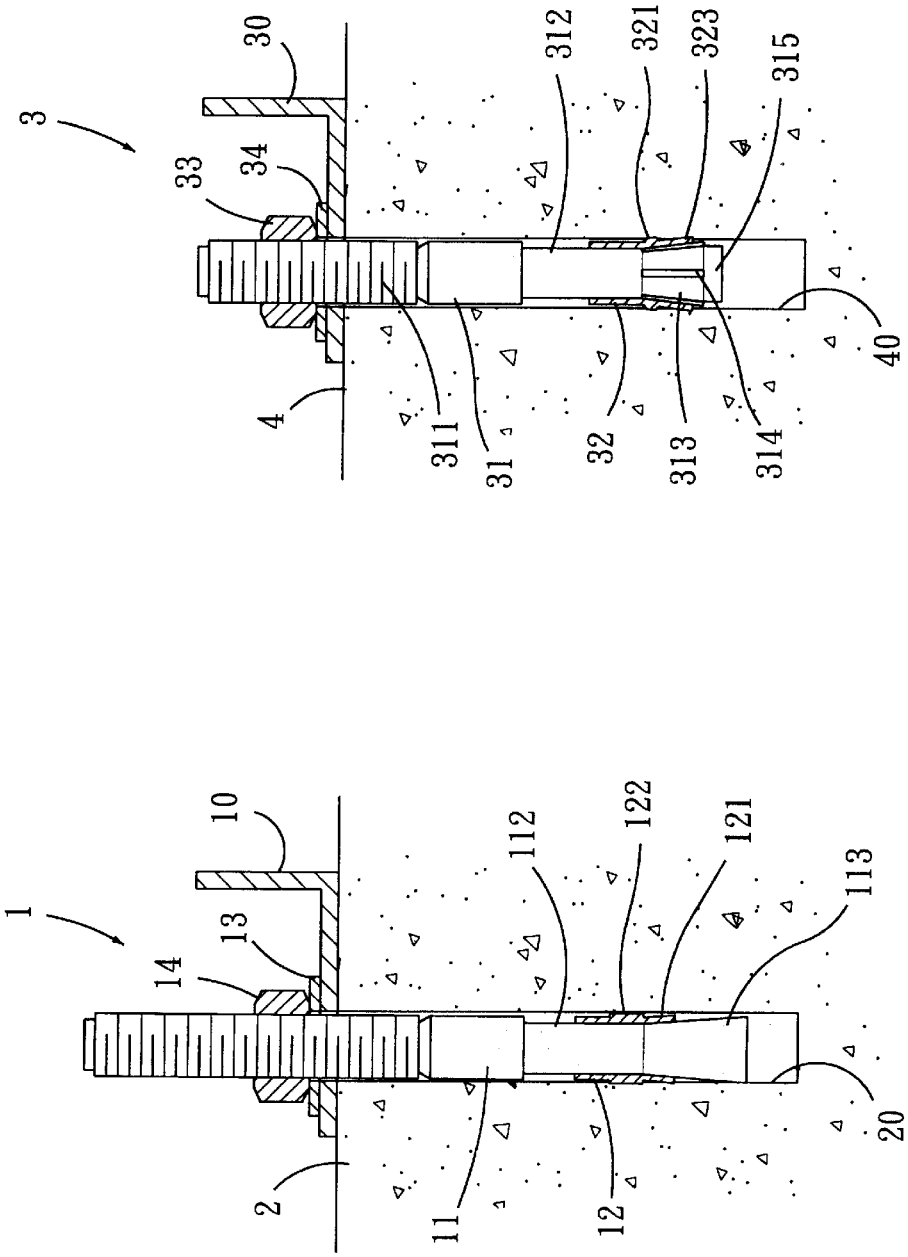
FIG. 2 is a partly sectional schematic view illustrating the conventional wedge anchor to FIG. 1 when driven into a blind hole.
FIG. 5 is a partly sectional schematic view illustrating the first preferred embodiment when driven into a blind hole.
Figure 6:
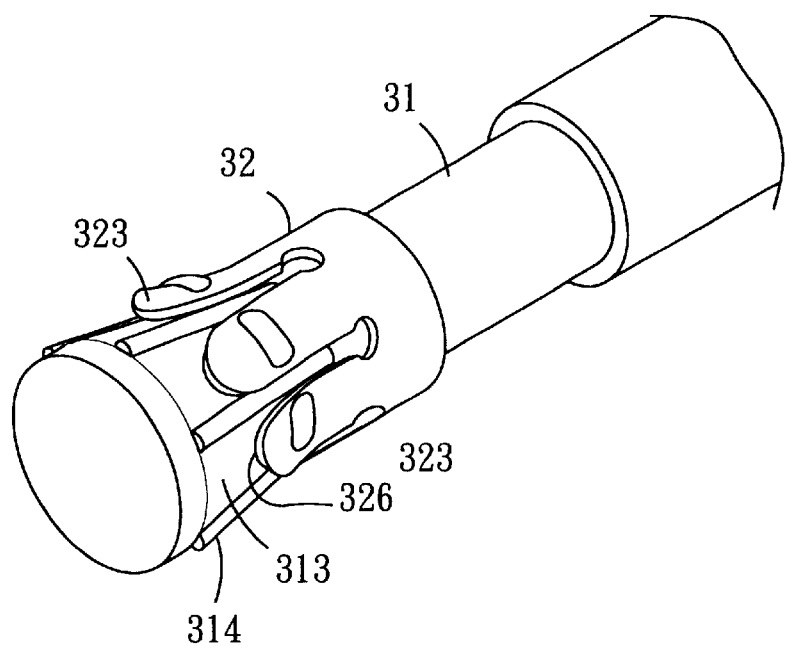
FIG. 6 is a fragmentary perspective view of the first preferred embodiment, illustrating an expansion sleeve thereof when in an expanded state.

With further reference to FIG. 5, in use, when mounting a bracket 30 on a wall 4, a blind hole 40, which has a diameter that corresponds to the outer diameter of the shank 31 when sleeved the expansion sleeve 32, is initially drilled into the wall 4. Thereafter, with the expansion sleeve 32 disposed thereon, the shank 31 is driven into the blind hole 40 with the use of a tool, such as a mallet. In view of the stop section 315, wobbling of the shank 31 in the blind hole 40 can be arrested. By using a spanner to rotate the nut fastener 33 relative to the shank 31, a torque is generated so as to create a force for moving the shank 31 outwardly of the blind hole 40. At this time, movement of the shank 31 will cause the bosses 321 on the retaining plates 322 to engage the surface of the blind hole 40. Also, with further reference to FIG. 6, as an increasing diameter of the expander section 313 extends into the expansion sleeve 32, in view of the curved distal edges 326 of the retaining plates 322, the expansion sleeve 313 will be guided relative to the expander section 313 to engage the longitudinal ribs 314 within the slits 322. As such, rotation of the expansion sleeve 32 relative to the expander section 313 can be arrested while the retaining plates 322 are being forced by the expander section 313 to expand in a radial outward direction for engaging the surface of the blind hole 40. Expansion of the retaining plates 322 can also be accomplished quickly in view of the larger angle formed by the surface of the expander section 313 with respect to the axis of the shank 31 and in view of the shorter arc lengths of the larger number of retaining plates 322 that form the expansion sleeve 32. Subsequently, the nut fastener 33 and the washer 34 are removed from the shank 31, and the bracket 30 is disposed on the shank 31. The nut fastener 33 and the washer 34 are again provided on the shank 31 for locking tightly the bracket 30 against the wall 4.

Figure 7:
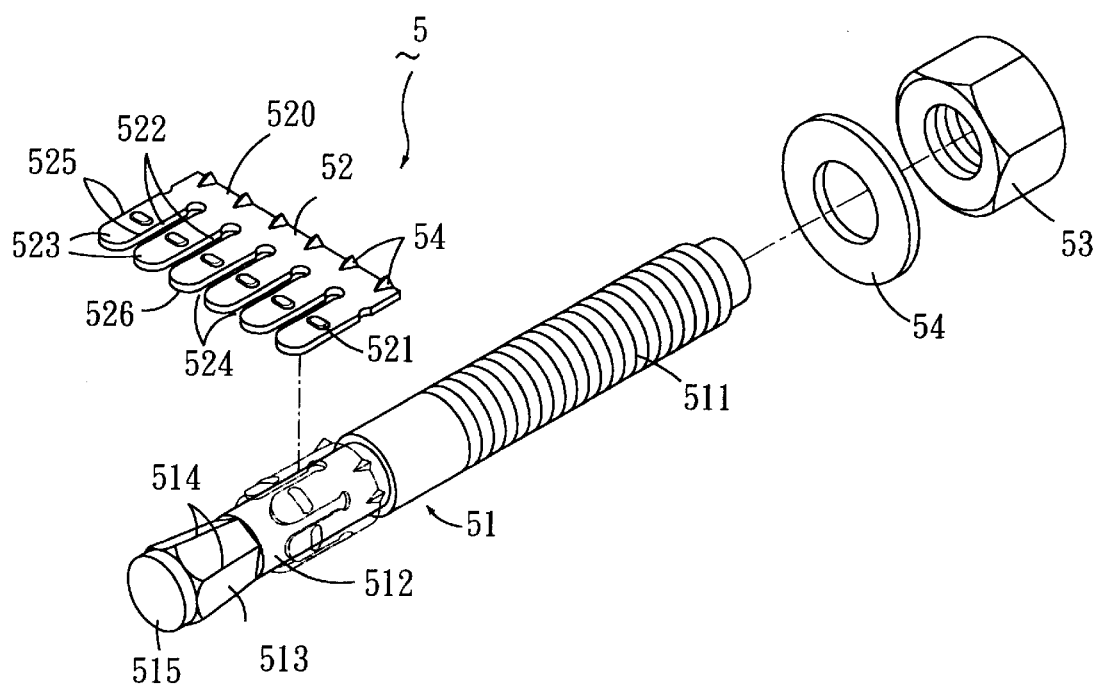
FIG. 7 is an exploded perspective view illustrating the second preferred embodiment of a wedge anchor according to the present invention.

Referring to FIG. 7, the second preferred embodiment of a wedge anchor 5 according to the present invention is shown to similarly comprise a shank 51, a tubular expansion sleeve 52, a nut transfer 53, and a washer 54. The shank 51 has threaded, neck, expander and stop sections 511, 512, 513, 515. The tubular expansion sleeve 52 is formed with slits 522, an annular base strip portion 520, and more than two retaining plates 523. Each retaining plate 523 has parallel lateral edges 525, a curved distal edge 526, and a boss 521. However, unlike the previous embodiment, the expander section 513 has a polygonal cross section, and the longitudinal ribs 514 are formed at adjoining edges of adjacent sides of the expander section 513. In addition, the base strip portion 520 of the expansion sleeve 52 is formed with a plurality of teeth projections 54, each of which projects radially and outwardly relative to the shank 51 and tapers in a direction toward the retaining plates 523.

Some of the advantages associated with the wedge anchor 3, 5 of this invention are as follows:

1. The surface of the expander section 313, 513 of the shank 31, 51 of the wedge anchor 3, 5 is formed with longitudinal ribs 314, 514, and the expansion sleeve 32, 52 is formed with a plurality of retaining plates 323, 523 that are formed with bosses 321, 521 and that confine slits 322, 522 for engaging the longitudinal ribs 314, 514. When the nut fastener 33, 53 is rotated, since the shank 31, 51 is disposed tightly in the blind hole 40, the expander section 313, 513 will extend into the expansion sleeve 32, 52 such that the longitudinal ribs 314, 514 are disposed in the slits 322 to prevent rotation of the expansion sleeve 32, 52 with the shank 31, thereby ensuring proper expansion of the retaining plates 321, 521.

2. The expansion sleeve 32, 52 has more than two interconnected retaining plates 323, 523 that encircle the shank 31. Because the arc lengths of the retaining plates 323, 523 are relatively short, the retaining plates 323, 523 are less rigid. In addition, since the surface of the expander section 313, 513 is formed with an angle that is greater than 8° with respect to the axis of the shank 31, 51, a shorter distance will be required to be traveled by the shank 31, 51 for expanding the retaining plates 323, 523. Thus, the wedge anchor 3, 5 of this invention takes up a relatively short amount of time for fixing on a wall 4.

3. Because a relatively short expander section 313, 513 is needed to expand the retaining plates 323, 523, the shank 31, 51 of the wedge anchor 3, 5 has a lower material requirement as compared to the aforesaid conventional wedge anchor 1, thereby resulting in lower costs. In addition, a shorter length of the shank 31, 51 projects from the wall 4 due to the shorter distance traveled by the shank 31, 51 when expanding the retaining plates 323, 523. The shorter projecting length of the shank 31, 51 can facilitate subsequent bracket mounting and locking operations.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A wedge anchor comprising:
   a shank having a threaded section, a neck section extending forwardly and coaxially from one end of the threaded section, and having a diameter smaller than that of the threaded section, and an expander section extending forwardly and coaxially from one end of the neck section, and having a cross-section that gradually decreases along an axis of the shank in a direction toward the threaded section;
   a tubular expansion sleeve shorter than the shank and sleeved on the neck section; and
   a nut fastener for engaging the threaded section of the shank;
   the expander section having a surface that forms an angle greater than 8° with respect to the axis of the shank, and being further formed with a plurality of longitudinal ribs that project radially and outwardly, that extend along the axis of the shank, and that are angularly spaced apart from each other;
   the expansion sleeve being formed with a plurality of axially extending slits for engaging the longitudinal ribs on the expander section when the expander section is extended into the expansion sleeve, the slits configuring the expansion sleeve with an annular base strip portion and more than two retaining plates, each having a base edge connected to the base strip portion, a pair of parallel lateral edges, and a distal edge that interconnects the lateral edges and that extends forwardly in a direction away from the base strip portion, the lateral edges of adjacent ones of the retaining plates confining the slits, the distal edges of the adjacent ones of the retaining plates cooperating to form entrances into the slits, each of the retaining plates being formed with a boss that projects radially and outwardly with respect to the shank.

2. The wedge anchor of claim 2, wherein the angle is between 10° and 22.5°.

3. The wedge anchor of claim 2, wherein the angle is between 10° and 15°.

4. The wedge anchor of claim 1, wherein the expander section has a frusto-conical configuration.

5. The wedge anchor of claim 1, wherein the expander section has a polygonal cross section, and the longitudinal ribs are formed at adjoining edges of adjacent sides of the expander section.

6. The wedge anchor of claim 1, wherein the shank has a stop section extending forwardly and coaxially from one end of the expander section and having a diameter equal to that of the threaded section.

7. The wedge anchor of claim 1, wherein the base strip portion is formed with a plurality of teeth projections, each of which projects radially and outwardly relative to the shank and tapers in a direction towards the retaining plates.

8. The wedge anchor of claim 1, wherein the expansion sleeve retaining plates have distal edges which are curved forwardly in a direction away from the base strip portion.

* * * * *